United States Patent [19]

Schulz

[11] Patent Number: 5,048,409
[45] Date of Patent: Sep. 17, 1991

[54] TRUSS FABRICATION MACHINE WITH JOYSTICK CONTROLS

[76] Inventor: Jack A. Schulz, Rte. 1, Box 285, Monett, Mo. 65708

[21] Appl. No.: 512,838

[22] Filed: Apr. 23, 1990

[51] Int. Cl.$^5$ .................... B30B 15/16; B30B 1/00
[52] U.S. Cl. ........................... 100/48; 100/100; 100/226; 100/269 R; 100/913; 227/152
[58] Field of Search ............... 100/913, 43, 48, 226, 100/269 R, 100; 227/152; 269/910; 29/432, 798

[56] References Cited

U.S. PATENT DOCUMENTS

| | | | |
|---|---|---|---|
| 3,068,484 | 12/1962 | Moehlenpah et al. | 100/913 X |
| 3,824,919 | 7/1974 | Moehlenpah | 100/913 X |
| 3,826,188 | 7/1974 | Eberle | 100/100 |
| 3,866,530 | 2/1975 | Moehlenpah | 100/913 X |
| 3,978,783 | 9/1976 | Moehlenpah | 100/913 X |
| 4,111,114 | 9/1978 | Carr | 100/913 X |
| 4,262,588 | 4/1981 | McDonald | 100/913 X |
| 4,679,291 | 7/1987 | Schmeal et al. | 29/798 X |
| 4,712,404 | 12/1987 | Crout et al. | 100/269 R X |

Primary Examiner—Harvey C. Hornsby
Assistant Examiner—Stephen F. Gerrity
Attorney, Agent, or Firm—D. A. N. Chase

[57] ABSTRACT

A truss fabricating machine includes a gantry movable along an X-axis and a pressing cylinder suspended from the gantry which is movable along the Y-axis allowing the pressing cylinder to be located above a joint in a wooden truss. The pressing cylinder presses down to seat connector plates into selected joints of the truss. A joystick generates electrical signals proportional to the direction and extent of movement of the joystick by the operator, which are converted to pulse width modulated electrical signals in a driver, whose output controls proportional solenoids that drive infinite positioning four-way hydraulic valves to actuate hydraulic motors that drive the gantry and pressing mechanism along either the X-axis, or through a separate hydraulic circuit, the Y-axis. The pressing cylinder can be moved along both axes simultaneously. When the pressing cylinder is in the desired position, a thumb switch on top of the joystick is actuated, causing the ram of the pressing cylinder to descend until it seats the connector plate. Releasing the thumb switch causes the ram to move upward to the top of its stroke.

8 Claims, 3 Drawing Sheets

TRUSS FABRICATION MACHINE WITH JOYSTICK CONTROLS

BACKGROUND OF THE INVENTION

1. Field of the Invention

The present invention is directed to a machine for fabrication of roof trusses. More particularly, the present invention is directed to such a machine that is controlled by a joystick.

2. Description of The Related Art

Pitched roofs are commonly supported by roof trusses. Roof trusses are commonly constructed of wood, particularly for wood-framed structures and residences. Roof trusses are manufactured in a wide variety of shapes and sizes according to the needs encountered in erecting a specific building. Because the roof line is usually fairly uniform throughout much of the length of a single building, many identical trusses are needed for a single building.

It has long been known that such trusses can be fabricated more efficiently through use of a truss table than they can by manual methods at the job site. The truss table is setup so that each precut piece of a particular truss fits into a channel created by parallel raised members fastened to the top of the truss table. When all the pieces for a single truss have been put in place on the truss table, they are fastened together. Nails, staples, and other similar fasteners have long been used. For some time, it has been common practice to fasten many of the joints, particularly those bearing greater loads, with connector plates, which consist of a flat plate having a large number of downward projecting parallel spikes generally created by pressing a flat plate within a specially designed die. A connector plate is seated on both the top and bottom sides of the joint as the truss lies on the truss table.

The connector plates may be seated by hammering or the like. Substantial forces are required to seat the connector means of a machine. Such a truss fabricating machine is disclosed in U.S. Pat. No. 3,826,188, issued to George F. Eberle on July 30, 1974.

Eberle '188 discloses a truss table having a hydraulic press for seating connector plates. The press reciprocates up and down on command and is located above the top of the truss table. A gantry carries the press along a set of parallel rails table and parallel to the transverse or Y dimension, direction, or axis of the table and perpendicular to the long, or X dimension, or direction, or axis of the truss table. One mechanism allows the press to be moved along the gantry itself, that is, along the Y-axis. Another mechanism allows the gantry to be moved along the X-axis, thereby allowing an operator who stands on an operator's platform at the end of the gantry to move the press to any desired location, then to actuate it, causing the press to stroke down with great force and to seat the connector plates which have been previously placed in position on the truss table and truss members on both the top and bottom of the truss members. An anvil located underneath the truss table and fixed to the gantry masts provides support for the press during pressing, thereby preventing the press from breaking the truss and the table.

The device of Eberle '188 suffers from several disadvantages. First, it requires the skillful manipulation of at least three different hydraulic control levers whose different functions must be learned by the operator. These control levers require considerable force to move and do not provide a precise response to the operator's touch. Further, although it is possible to move the press along both the X-axis and the Y-axis simultaneously, it requires a highly skilled operator using both hands to do so and he must concentrate clearly on the job at hand at all times. Consequently, the operator frequently fails to locate the press directly above a particular connector plate on the first try, but must repeatedly make second and third efforts. This repetition leads to decreased productivity and accelerated wear on the equipment.

Accordingly, there is a need for a truss fabricating machine which seats connector plates that is easier to control than truss fabricating machines of the prior art; that is more responsive to the operator s touch; that allows the operator to control all movement of the press with one hand; that is intuitive to use because the movement of the press mimics the movement of the operator s hand; and that allows the press to be easily and accurately moved along both the X-axis and the Y-axis simultaneously.

SUMMARY OF THE INVENTION

Accordingly, it is the primary object of the present invention to provide a truss fabricating machine which seats connector plates that is easier to control than the truss fabricating machines of the prior art.

It is a further object of the present invention to the operator's touch.

It is a further object of the present invention to provide a truss fabricating machine that allows the operator to control all movement of the press with one hand.

It is a further object of the present invention to provide a truss fabricating machine that is intuitive to use because the movement of the press mimics the movement of the operator's hand.

It is a further object of the present invention to provide a truss fabricating machine that allows the press to be easily and accurately moved along both the X-axis and the Y-axis simultaneously.

These and other objects of the present invention are achieved by providing a truss fabricating apparatus having an elongated table for supporting truss elements to be joined by connector plates pressed into place thereon, a gantry spanning the table and movable longitudinally thereof, and at least one press unit mounted on the gantry for movement therealong transversely of the table. The press unit may be moved along either an X-axis or a Y-axis or both simultaneously to successive positions where the press unit may be actuated to engage the connector plates. The truss fabrication machine includes a control system for the gantry and the press unit comprising reversible motor means connected with the gantry for driving it, a reversible drive connected with the press unit for moving it along the gantry and transverse to the table, a joystick control movable in positive and negative X directions (i.e., along the X-axis) corresponding to movement of the gantry longitudinally of the table, and movable in positive and negative Y directions (i.e., along the Y-axis) corresponding to movement of the press unit along the gantry transversely of the table.

The truss fabrication machine further comprises means responsive to X-direction movement of the control for producing an electrical gantry control signal having a magnitude dependent upon the X-direction polarity and displacement of the control, means responsive to Y-direction movement of the control for producing an electrical, press unit control signal having a magnitude dependent upon the Y-direction polarity and displacement of the control, and a driver means connected with the reversible motor means and the reversible drive for operating the same in response to the gantry and press unit control signals, causing the gantry to move longitudinally of the table in a direction and at a speed governed by the gantry control signal, and causing the press unit to move transversely of the table in a direction and at a speed governed by the press unit control signal. These controls and moving means shift the press unit to a position for engagement with a connector plate. Selectively operable means is connected with the press unit for actuating the unit to extend the pressing head, whereby the joystick control and selectively operable means enable an operator to guide the press unit to the successive positions required for installation of the truss connector plates.

These and other objects of the present invention will become apparent from the following description taken in conjunction with the accompanying drawings, wherein is set forth by way of illustration and example, the preferred embodiment of this invention.

BRIEF DESCRIPTION OF THE DRAWINGS

FIG. 6 is a schematic top plan view of the joystick illustrating the directions along which it can be displaced from its vertically centered neutral position.

DETAILED DESCRIPTION OF THE PREFERRED EMBODIMENT

Figure 1:
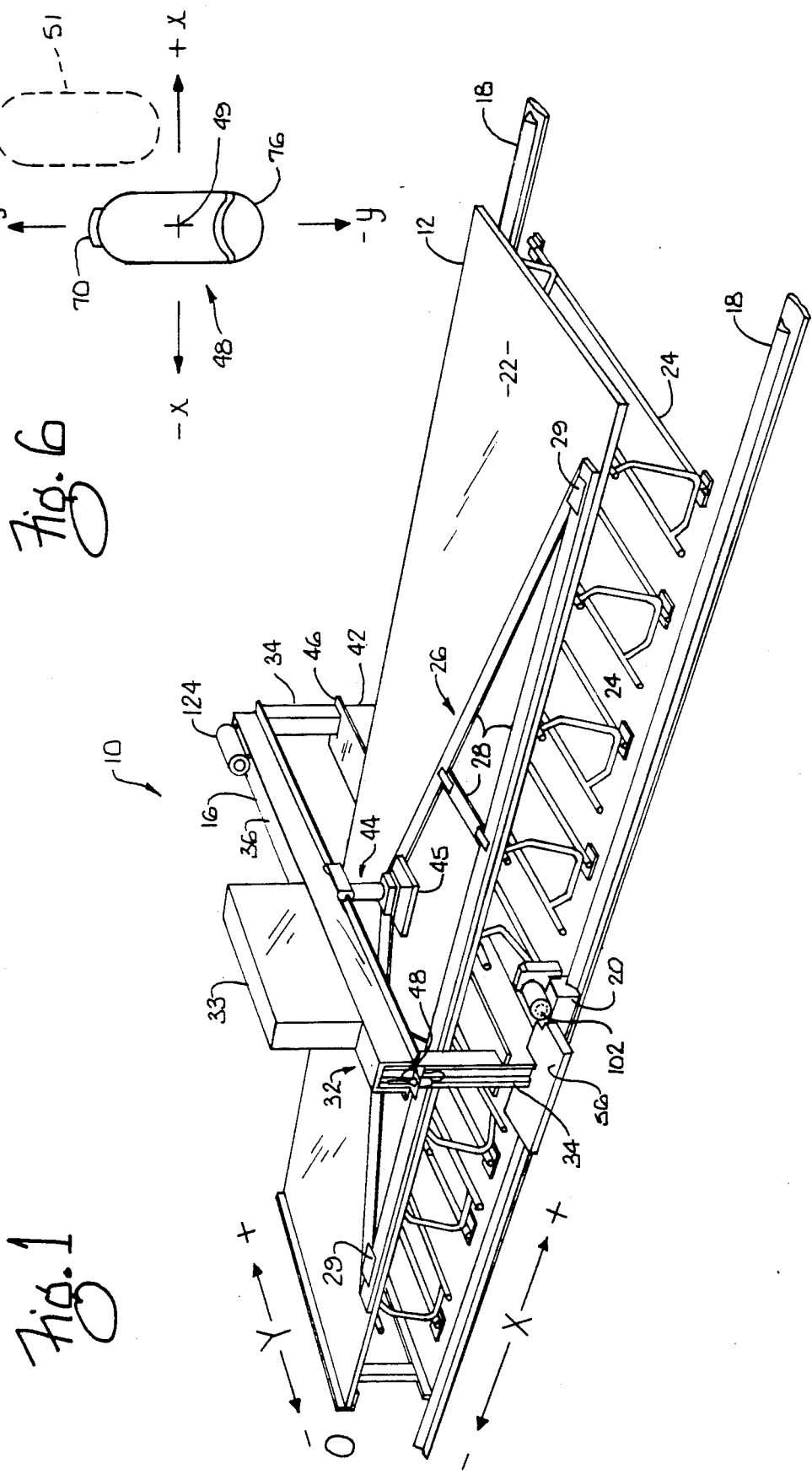
FIG. 1 is a perspective view of a truss fabricating machine according to the present invention.

Referring to FIG. 1, there is shown the truss fabricating machine 10 for joining precut pieces of lumber with pronged connector plates to form a roof truss or similar structure. The truss fabricating machine 10 includes a jigging table 12 for positioning the truss members and a pressing mechanism, generally 16.

The table 12 is disposed between two parallel tracks or rails 18 secured to the floor, upon which the pressing mechanism 16 rides in mating guides 20. The pressing mechanism 16 rides on the tracks or rails 18 along the X-axis, that is, the elongated dimension of the table 12.

The table 12 includes a working platform, or top 22, which is supported by a plurality of parallel shiftable supporting units 24 comprising legs that depress upon contact from the pressing mechanism 16 as it moves along the X-axis in either the positive (to the right in FIG. 1 as viewed from the operator s platform 56) or the negative X direction (to the left as viewed in FIG. 1 from the operator s platform 56), to permit the anvil portion of the pressing mechanism to pass beneath the tabletop according to principles well known in the prior art.

The platform or tabletop 22 has a base formed of any sturdy flat surface, but typically made from sheets of ¾ inch (1.9 cm) tongue and groove solid core plywood set edge to edge to form the base. As shown in Eberle '188 but not illustrated herein, a plurality of parallel, upwardly opening steel channels secured to the base may extend the length of the table 12 and have inwardly turned flanges which accommodate adjustable jigging pads. Fitted between the channels are filler pieces of wood such as ¾ inch (1.9 cm) plywood that in turn are covered by top pieces which may be ⅛ inch (0.3 cm) fiberboard. The upper surfaces of the top pieces should lie flush with the flanges on the channels.

The pressing mechanism 16 includes a frame 32 which in plan view extends parallel to the Y-axis and includes vertical support members 34 for holding the gantry 36 above the table 12 and parallel to the top of the table 12. The pressing mechanism 16 includes wheels 62 (see FIG. 2) contained within the carriages or guides 20, which ride on the tracks 18. Each carriage 20 includes a hydraulic motor 102 connected to the carriage wheels 62 through sprocket and chain drives for driving the pressing mechanism 16 along the X-axis. The frame 32 is welded to the carriages 20. A bridge bearing (not shown), that is, a pivot block attaching one carriage to one vertical support member 34 of the gantry 36, allows the carriage wheels to remain engaged on the tracks 18 even if the tracks 18 are not precisely parallel or have irregularities.

The pressing mechanism further includes a cross beam 42 that is parallel to the gantry 36, but travels under the table 12 and is also seated on bridge bearings. The cross beam 42 is used as an anvil to absorb the force of the press 44 when it drives down onto the truss 26. The truss 26 includes a plurality of truss members 28 laid on the tabletop 22 in the desired pattern with a connector plate 29 below the joints formed by adjoining members and a truss plate 29 lying on top of each joint, as the truss members are lying on the tabletop 22.

The cross beam 42 carries a top plate 46 that is somewhat wider than the box beam 42 and provides the surface of the anvil. The top plate is located at a height very slightly under the bottom surface of the table 12 so that it does not drag along the table when the pressing mechanism 16 is moved along the X-axis. Six rollers, with three positioned along each longitudinal edge of the top plate 46 contact the bottom of the table top 12 until the press 44 is actuated.

Figure 2:
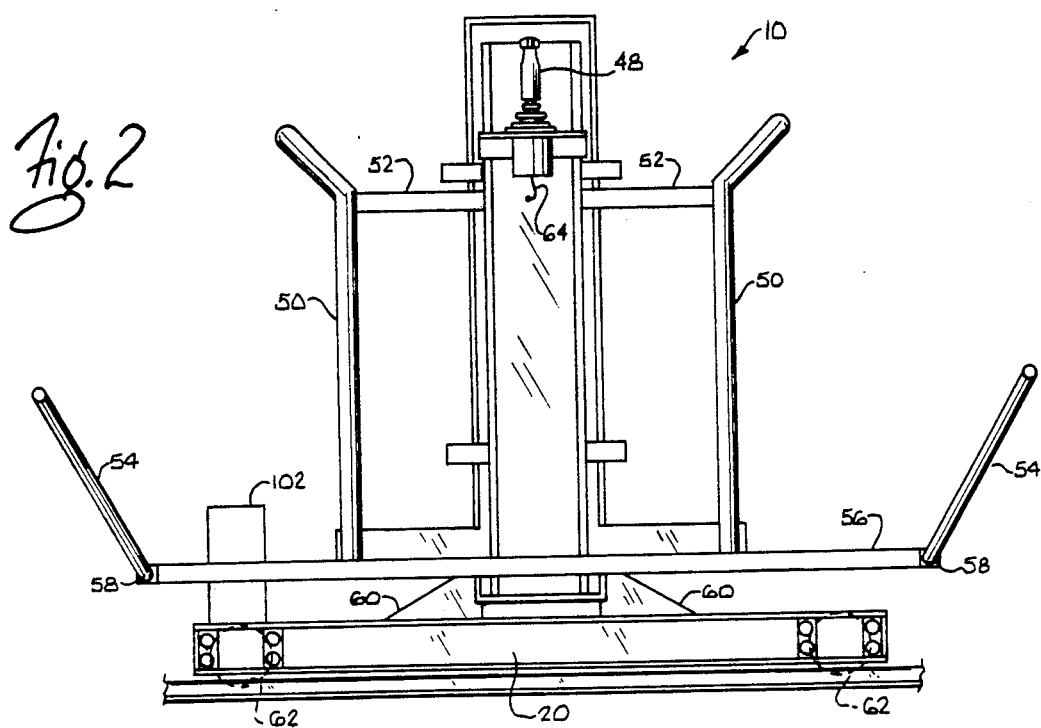
FIG. 2 is a simplified front elevational view from the vantage point of the operator of the truss fabricating machine of FIG. 1.

Referring to FIG. 2, the pressing mechanism 16 carries an operator's platform 56 where the operator stands to control the truss fabricating machine 10 by manipulating the joystick 48. The platform 56 includes protective side guard rails 50 and horizontal guard rails 52. Two safety switch stop bars 54 are mounted on the platform 56. The stop bars 54 are pivotally attached to the floor of the platform 56 by the pivot joints 58 and actuate a safety switch that stops all operation of the truss fabricating machine 10 when either one is pushed upward by a moderate force, such as that which would be encountered if the pressing mechanism 16 were to run into a person while traveling on the rails 18.

Still referring to FIG. 2, one X-axis or direction motor 102 is visible on the left-hand side of the working platform 22. Two drive motors 102 operating in unison are required, one on each side of the pressing mechanism 16, to provide true parallel travel of the two ends of the gantry 36 and to reduce the probability of the carriages 20 binding on the tracks 18.

The operator's platform 56 is joined to gantry 36 by suitable means such as welding. As an alternative, a separate operator s platform may be located on each side of the table 12 along with a separate joystick 48, allowing the truss fabricating machine to be operated from either side of the table. The gantry 36 also carries the control box 33 which includes much of the electrical circuitry and hydraulic equipment described below.

Figure 3:
FIG. 3 is a simplified side elevational view from the vantage point of the operator of the truss fabricating machine of FIG. 1.

Referring to FIG. 3, the joystick 48 is attached to electrical circuitry explained below by the electrical lead set 64, which transmits the electrical signals fed from the joystick 48 to the driver 100 (FIG. 5), described below. The signals developed by manipulation of the joystick 48 are related to the direction and magnitude of displacement of the joystick 48 from its central upright neutral position 49 (FIG. 6). Referring to FIG. 6, which is a schematic plan view of the joystick 48, it is shown that the top of the joystick 48 can be moved along the X-axis of the tabletop 22 with either positive (to the right) or negative (to the left) polarity and along the Y-axis of the table 22 with either positive (up in FIG. 6, or away from the operator s platform 56 in FIG. 1) or negative polarity (down in FIG. 6 or toward the operator s platform 56 in FIG. 1). As illustrated by the ghost-image 51 of the joystick 48, the joystick 48 can also be moved in any pattern or direction within the limits of its movements. Moving toward the ghost-image 51 produces signals causing the press 44 to move along both the X-axis and the Y-axis simultaneously. Regarding the axes, it could also be said that the joystick 48 itself has an X-axis and a Y-axis that are each parallel to the corresponding axes of the tabletop 22. The essential feature of use of the joystick 48 for control is that the movements of the press 44 mimic the movements of the joystick 48.

Figure 4:
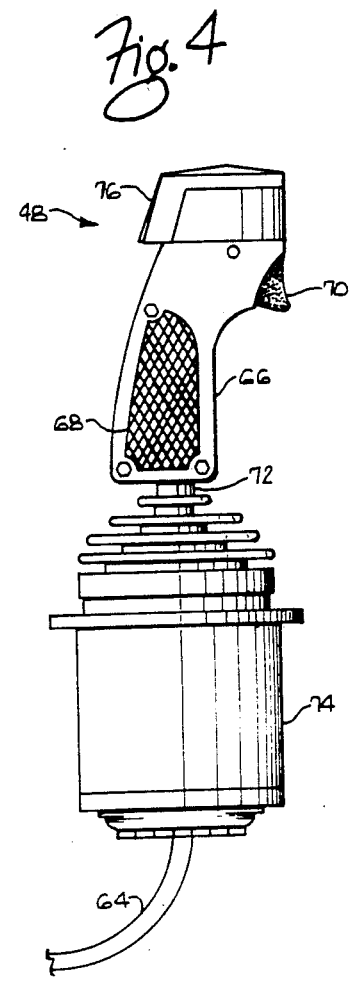
FIG. 4 is a side elevational view of the joystick used to control the truss fabricating machine of FIG. 1.

Referring now to FIG. 4, there is shown an enlarged side elevation of the joystick 48, which includes a pistol grip 66 having cross-hatched friction ridge surfaces 68 and a trigger 70, which operates as a safety switch, for whenever the trigger 70 is released, the truss fabricating machine 10 stops. The trigger 70 is a normally open switch that controls a relay in the main control panel so that the entire truss fabricating machine 10 is deactivated when the trigger is released. When the trigger is depressed, the truss fabricating machine 10 is activated. The stem 72 supports the pistol grip 66 and its opposite end terminates in a ball and socket joint (not shown) inside the housing 74, wherein electrical circuitry converts the motion of the pistol grip 66 into related electrical signals that are ultimately used to actuate hydraulic valves for controlling motion of the press unit or pressing cylinder 44 along the X-axis and the Y-axis.

A thumb switch 76 is located in the top of the joystick 48 and can be moved either to the left or to the right as the operator faces the table 12. When moved in either direction, the thumb switch 76 energizes a relay 138 (FIG. 5) which controls operation of the hydraulic pressing cylinder 44 that, in turn, controls the up and down motion of its pressing head 45, as will be described in greater detail below.

The speed of the motion of the press 44 along either the X-axis or the Y-axis is proportional to the distance that the joystick is moved relative to its centered vertical normal position, which represents neutral and will not cause the gantry 36 or the press 44 to move along either the X-axis or the Y-axis.

A suitable joystick 48 is now manufactured by and available from P-Q Controls, Inc. of Bristol, Conn., U.S.A., and several other suppliers, and may include a 20° maximum travel along the Y-axis on either side of the vertical neutral position, a maximum of 15° on either side of the vertical neutral position along the X-axis, and a maximum 27° travel in any direction not directly along the X-axis or the Y-axis. The trigger has 0.028 inch (7 mm) total pull and requires 0.1 inches (2.5 mm) to switch. The voltage supply may be from 5 to 15 volts DC. The reference voltage is 50 percent of the voltage supply. The output when the pistol grip 66 handle is vertically centered is also 50 percent of the voltage supply, that is, the same as the reference voltage. Full positive deflection in any direction results in a signal of 60 percent of the voltage supply, while full negative deflection in any direction generates a signal having 40 percent of the voltage supply.

Figure 5:
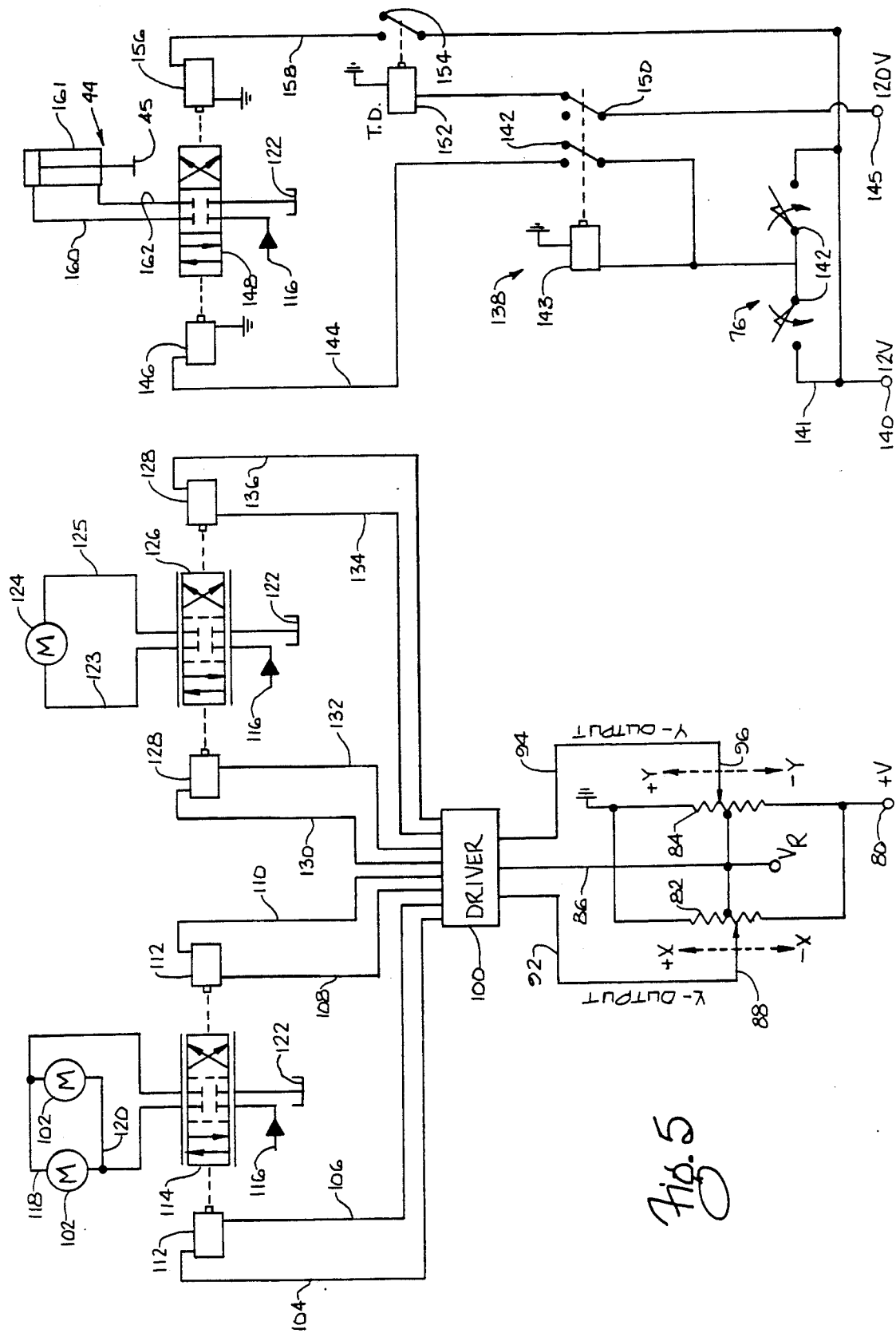
FIG. 5 is a schematic diagram of the electrohydraulic control mechanisms of the truss fabricating machine of FIG. 1.

Referring now to FIG. 5, there is shown a schematic illustration of the electro-hydraulic circuitry that controls the movement of the press 44. Other fluid-driven circuits, e.g. pneumatic, could easily be substituted for the hydraulic components of the system. The joystick 48 is schematically illustrated in the lower left-hand portion of FIG. 5. The joystick 48 utilizes a source voltage +V on the lead 80 from the control box 33 (FIG. 1), which may be between 5 and 15 volts DC and which is supplied to two grounded resistors, resistor 82 for the X-axis motion detection and resistor 84 for the Y-axis motion detection. The resistors 82, 84 are portions of potentiometers that are centered with the reference voltage, VR, along the lead 86. The point of contact of the lead 88 on the resistor 82 changes when the joystick 48 is moved from the centered vertical neutral position along the X-axis. The x output on the lead 92 thereby becomes a DC voltage that is proportional to the displacement of the joystick 48 away from its neutral centered position. The full positive deflection of 15° to the right as viewed from the operator's platform in FIG. 1 produces a signal of 60 percent of the voltage power supply, whereas the full negative deflection of 15° to the operator's left as viewed in FIG. 1 produces a voltage signal of 40 percent of the voltage supply.

Similarly, the y output on the lead 94 changes as the potentiometer contact 96 moves along the resistor 84 in response to movements of the joystick along the Y-axis. The y output signal on the lead 94 is also at the reference voltage when the joystick 48 is in the centered neutral position, 60 percent of the voltage supply when the joystick is in the full positive deflection, that is, away from the operator as illustrated in FIG. 1 by a maximum of 20° deflection from the vertical neutral position, and 40 percent of the voltage supply upon full negative deflection, that is, 20° away from the centered neutral position and toward the operator.

In the preferred embodiment, the internal mechanism of the joystick 48 allows the joystick to be moved at any angle within the cone described, leading to a maximum travel between axes of 27°. These movements create simultaneous x output and y output signals and will be acted on simultaneously by a driver 100, to produce movement of the press 44 along both the X-axis and the Y-axis simultaneously. That movement may describe a straight line at an angle of 45° from the origin 0 of FIG. 1, a curve, or any other of an infinite number of curves between two points, depending upon the combination of X-axis input and Y-axis input that the operator selects through his motions of the joystick 48.

The X output signal on the lead 92, the reference signal on the lead 86, and the Y output signal on the lead 94 are all transmitted to the driver 100, which is an electronic interface between a command source, namely the joystick 48, and an electrically modulated valve or transmission stroker such as the proportional solenoids employed here to actuate the hydraulic valves. A suitable driver is the model 516 currently manufactured by P-Q Controls, Inc. of Bristol, Conn., U.S.A. The driver 100 provides a ramp, or acceleration and deceleration, function causing a smoothed output to the valve regardless of the abruptness of signal changes from the command source, or joystick 48.

The driver 100 provides a current source output that can be configured to drive single coil, dual coil, or single coil polarity reversal (floating coil) valves. The electrical current output remains constant within 10 percent over a wide voltage supply swing, typically 10 to 30 volts DC, and a wide resistance shift, which occurs as the valve coil heats up. The command source can be a potentiometer, switch, or a joystick as is employed in the preferred embodiment.

Using the driver 100 to control the solenoids and valves described below enables the joystick 48 to be readily replaced by a programmable control or computer interface, which obviates the need for an operator to visually direct the machine from the operator's platform 56.

The output from the proportional channel outputs of the driver 100 is a pulse width modulated electrical signal with current monitoring to drive the proportional solenoids on the hydraulic valves. The frequency of the pulse width modulated output is more critical with some hydraulic valves, so the driver 100 is calibrated for both the frequency and voltage required to meet the operational specifications of the particular valve it drives. The frequency and magnitude of the driver outputs are also adjusted to counteract oscillations in hydraulic fluid output and excessive hysteresis.

The driver board 100 is powered by a regulated power supply (not shown), but can be operated from a vehicle battery in the field. The supply voltage +V should be free from AC ripple and DC spikes and have power capable of driving all functions under full load.

The leads 86, 92, 94, which provide the command source inputs to the driver 100 are shielded cables having grounded shields to eliminate interference.

Two hydraulic motors 102 control movement of the pressing mechanism 16 along the X-axis. The electrical signals on the leads 104, 106, 108, 110 actuate a pair of opposed proportional solenoids 112, which in turn control an infinite positioning four-way valve 114. A hydraulic pressure source 116 supplies the source of motive power through the hydraulic lines 118, 120 and the hydraulic fluid is returned to a reservoir 122 on the drain side of the hydraulic circuit.

Each of the proportional solenoids 112 shifts its armature a distance that is proportional to the strength of the triggering electrical signal delivered to the proportional solenoid 112. This action, in turn, causes the infinite positioning four-way valve 114 to regulate the flow of hydraulic fluid through the valve, and hence through the motors 102 throughout an infinite continuum of flow rates between the on and off states. This allows the motors 102 to control the speed at which the pressing mechanism 16 moves along the X-axis. This allows the operator to delicately control the rate of acceleration, deceleration, and the speed of the pressing mechanism 16 along the X-axis.

A similar arrangement drives the pressing cylinder 44 along the gantry itself, that is, along the Y-axis. The press 44 is suspended from the gantry 36 and rides therealong transversely of the table 12 in the manner as disclosed in the aforesaid Eberle '188 patent. A hydraulic motor 124 on the top of the gantry 36 is driven by hydraulic fluid flowing through the hydraulic lines 123, 125 from a hydraulic pressure source 116, and is routed through the hydraulic lines 125 into the drain side reservoir 122 when its energy has been expended. The direction of drive and rate of acceleration, deceleration and speed of the motor 124 are controlled by an infinite positioning four-way valve 126, whose flow rates are regulated by a pair of opposed proportional solenoids 128. The degree of engagement of the solenoids 128, in turn, is controlled by electrical signals from the driver 100 transmitted along the leads 130, 132, 134 and 136. The hydraulic motor 124 is connected to the press 44 by a sprocket and chain drive (not shown).

When the operator has moved the press 44 to a position directly above the connector plates, he actuates the thumb switch 76 at the top of the joystick 48, which is schematically represented in the lower right-hand portion of FIG. 5. The thumb switch 76 operates a relay 138 driven by the 12 volt power supply 140. The thumb switch 76 is normally in a neutral or off vertical position and can be toggled either to the left or the right with the same effect, namely engaging the pair of normally open switch contacts 142, which closes the 12 volt circuit along the lead 141 to actuate the relay coil 143 of the relay 138. This closes the normally open relay contacts 142, delivering 12 volts to the solenoid 146 along the lead 144. The solenoid 146 opens the four-way hydraulic valve to allow hydraulic fluid to be pumped into the upper chamber of the double acting hydraulic cylinder 161, causing the ram of the press 44 to move down through the full length of its stroke, thereby seating the connector plate. The operator must keep the thumb switch 76 engaged until the connector plate is seated.

Then the operator releases the thumb switch 76, cutting off the 12 volt supply that actuated the relay 138, and cutting off the electricity to the solenoid 146. While the relay 143 is actuated the normally closed contacts 150 of the relay 143 are opened, preventing current from reaching the relay coil of the time delay relay 152. When the operator releases the thumb switch 76 the contacts 150 of the relay 138 close, thereby delivering excitation from the 120 volt power source 145 to the time delay relay 152, which closes the contacts 154. This delivers 12 volts from the 12 volt power supply 140 along the lead 158 to the solenoid 156, which actuates the four-way valve 148 and allows hydraulic fluid to be pumped into the bottom chamber of the double acting hydraulic cylinder 161, thereby drawing the ram of the press 44 up to the top of its stroke. The time delay relay 152 remains on and keeps its contacts 154 closed long enough for the ram to rise to the top of its stroke without action by the operator. When the pressing ram reaches the top of its stroke, the time delay relay times out despite still being connected to the 120 volt power, and the contacts 154 are opened, the solenoid 156 is de-energized and the four-way valve 148 returns to a neutral position and releases pressure on the hydraulic fluid inside the cylinder 161, but keeps the ram stationary by not allowing fluid to flow into or out of the cylinder 161.

While certain forms of this invention have been illustrated and described herein, the invention is not limited thereto, except insofar as such limitations are included in the following claims.

Having thus described the invention, what is claimed as new and desired to be secured by Letters Patent is:

1. In a truss fabricating apparatus having an elongated table for supporting truss elements to be joined by connector plates pressed into place thereon, a gantry spanning the table and movable longitudinally thereof, and at least one press unit mounted on the gantry for movement therealong transversely of the table to successive positions where the press unit may be actuated to engage the connector plates, a control system for the gantry and the press unit comprising: the same;

a reversible drive connected with said press unit for causing the same to move along the gantry and traverse the table;
a joystick control movable in positive and negative X directions corresponding to movement of the gantry longitudinally of the table, and movable in positive and negative Y directions corresponding to movement of the press unit along the gantry transversely of the table;
means responsive to X-direction movement of said control for producing an electrical, gantry control signal representative of the X-direction polarity and displacement of the control;
means responsive to Y-direction movement of said control for producing an electrical, press unit control signal representative of the Y-direction polarity and displacement of the control;
driver means connected with said reversible motor means and said reversible drive for operating the same in response to said gantry and press unit control signals to cause the gantry to move longitudinally of the table in a direction and at a speed governed by said gantry control signal, and to cause the press unit to move transversely of the table in a direction and at a speed governed by said press unit control signal, whereby to shift the press unit to a position for engagement with a connector plate; and
selectively operable means connected with said press unit for actuating the same, whereby the joystick control and selectively operable means enable an operator of the apparatus to guide the press unit to the successive positions required for installation of the truss connector plates.

2. The combination as claimed in claim 1, wherein said gantry is provided with an operator's platform, and wherein said joystick control is mounted on the gantry adjacent to the platform for manipulation by an operator of the apparatus.

3. The combination as claimed in claim 1, wherein said joystick control is also movable simultaneously in either X direction and either Y direction.

4. The combination as claimed in claim 1, wherein said gantry control signal has a magnitude dependent upon the X-direction polarity and displacement of the joystick control, and wherein said press unit control signal has a magnitude dependent upon the Y-direction polarity and displacement of said control.

5. The combination as claimed in claim 1, wherein said press unit includes an extensible and retractable pressing head for engaging connector plates to be united with truss elements supported on said table, and wherein said selectively operable means comprises switch means on the joystick control and electrical control means responsive to operation of said switch means for actuating said press unit to extend and retract said pressing head.

6. A truss fabrication machine comprising:
a table comprising a tabletop having an X-axis and a transverse Y-axis;
a pressing mechanism comprising a frame supporting a transverse gantry above said tabletop and an anvil generally parallel to said gantry under said tabletop, said gantry and said anvil being mounted on two spaced carriages;
a pair of tracks extending parallel to said X-axis adjacent to and on opposite sides of said table, said tracks supporting said carriages to allow said gantry to travel along said tracks;
a pressing unit including an extensible and retractable pressing head mounted on said gantry and operable to extend said head toward and onto said tabletop and to return it to a starting position;
means for moving said gantry along said tracks;
means for controllably moving said pressing unit along said gantry;
means for actuating said pressing unit whereby said pressing head extends to seat connector plates into truss members; and
command means for electrically controlling said gantry moving means, said pressing unit moving means and said actuating means, including a manually operated control having electrical outputs and means for delivering signals at said outputs representative of movement of said manual control corresponding to desired X and Y directions of movement of said gantry and pressing unit, and means responsive to said signals for driving said gantry moving means and pressing unit moving means.

7. A truss fabrication machine as claimed in claim 6, wherein said manually operated control comprises a joystick having a centered neutral position, said signals having a relationship to the displacement of said joystick away from said centered neutral position.

8. A truss fabrication machine as claimed in claim 7, wherein said gantry moving means further comprises an infinitely adjustable gantry valve operatively connected to at least one fluid-driven motor and a pair of proportional solenoids operatively connected to said gantry valve, and said pressing unit moving means further comprises an infinitely adjustable pressing unit valve operatively connected to a fluid-driven motor and a pair of proportional solenoids operatively connected to said pressing unit valve, and wherein said signal delivery means provides said signals in response to displacements of said joystick from said neutral position for driving said proportional solenoids.

* * * * *

UNITED STATES PATENT AND TRADEMARK OFFICE
CERTIFICATE OF CORRECTION

PATENT NO. : 5,048,409

DATED : September 17, 1991

INVENTOR(S) : JACK A. SCHULZ

It is certified that error appears in the above—identified patent and that said Letters Patent is hereby corrected as shown below:

Column 1, line 47, between "rails" and "table" insert --or tracks. The gantry is located above the top of the truss--.

Column 1, line 49, delete "or", second occurrence.

Column 6, line 4, delete "0.028" and substitute --0.28--.

Column 9, line 11, between "comprising:" and "the same;" insert --reversible motor means connected with said gantry for driving--.

Signed and Sealed this

Twenty-ninth Day of December, 1992

*Attest:*

DOUGLAS B. COMER

*Attesting Officer*     *Acting Commissioner of Patents and Trademarks*